United States Patent
Sellers

(10) Patent No.: US 7,242,412 B2
(45) Date of Patent: Jul. 10, 2007

(54) METHOD AND APPARATUS FOR EXPANDING A SOURCE PIXEL IN A DIGITAL IMAGE

(75) Inventor: Graham Sellers, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 11/054,102

(22) Filed: Feb. 9, 2005

(65) Prior Publication Data

US 2006/0176315 A1    Aug. 10, 2006

(51) Int. Cl.
- G06T 15/50  (2006.01)
- G09G 5/00   (2006.01)
- G06K 9/40   (2006.01)
- G06T 17/00  (2006.01)
- G09G 5/02   (2006.01)
- G06K 9/32   (2006.01)

(52) U.S. Cl. .............. 345/606; 345/426; 345/428; 345/611; 382/266; 382/269; 382/300

(58) Field of Classification Search ............... 345/420, 345/426, 428, 581, 586, 589, 606, 611; 382/254, 382/266, 268–269, 274, 300

See application file for complete search history.

(56) References Cited

U.S. PATENT DOCUMENTS

| | | |
|---|---|---|
| 4,578,812 A | 3/1986 | Yui |
| 4,633,503 A | 12/1986 | Hinman |
| 5,161,035 A | 11/1992 | Muramatsu |
| 5,363,213 A | 11/1994 | Coward et al. |
| 5,703,965 A | 12/1997 | Fu et al. |
| 5,721,793 A | 2/1998 | Ushida et al. |
| 5,754,710 A | 5/1998 | Sekine et al. |
| 6,236,766 B1 | 5/2001 | Zavaljevski et al. |
| 6,608,699 B2 | 8/2003 | Kishimoto |
| 6,624,825 B1 | 9/2003 | Fujiyoshi |
| 6,704,463 B1 | 3/2004 | Okada et al. |
| 6,714,692 B1 | 3/2004 | Kim et al. |
| 6,928,196 B1 * | 8/2005 | Bradley et al. ............. 382/300 |
| 2002/0057362 A1 * | 5/2002 | Wredenhagen et al. ..... 348/441 |
| 2003/0099410 A1 | 5/2003 | Daigi |
| 2003/0190092 A1 | 10/2003 | Dyas et al. |
| 2004/0052423 A1 | 3/2004 | Saxton |
| 2005/0008251 A1 * | 1/2005 | Chiang ....................... 382/266 |

* cited by examiner

Primary Examiner—Wesner Sajous
(74) Attorney, Agent, or Firm—Mark P. Watson

(57) ABSTRACT

An apparatus for expanding a source pixel in a digital image includes an edge direction detector detecting edge direction in the vicinity of the source pixel. An interpolator interpolates multiple sets of pixels in a region surrounding the source pixel in the detected edge direction to generate a set of output pixels representing an expansion of the source pixel. Methods and computer programs for expanding a source pixel in a digital image are also provided.

27 Claims, 3 Drawing Sheets

METHOD AND APPARATUS FOR EXPANDING A SOURCE PIXEL IN A DIGITAL IMAGE

FIELD OF THE INVENTION

The present invention relates to image processing and in particular to a method, apparatus and computer program for expanding a source pixel in a digital image and to a method and apparatus for doubling the size of a digital image.

BACKGROUND OF THE INVENTION

Expanding or enlarging digital images is common practice and many techniques to achieve digital image expansion have been considered. As is known, during expansion of an input digital image, it is necessary to generate new pixels between the existing source pixels of the input digital image. One common technique used when an input digital image is being doubled in size, involves determining pixels of the output digital image whose centers coincide with the centers of source pixels in the input digital image and assigning values to those output pixels so that they are simply copies of the source pixels. Pixels in the output digital image whose centers do not coincide with the centers of source pixels in the input digital image are generated as a function of surrounding pixels in the input digital image. Functions used to generate such output pixels include for example linear and cubic interpolations. Unfortunately using linear and cubic interpolation techniques to generate only some of the pixels of the output digital image from source pixels of the input digital image can yield an output digital image that appears jagged and unsmooth.

Other techniques for enlarging a digital image have also been considered. For example, U.S. Pat. No. 5,721,793 to Ushida et al. discloses an image processing method for converting a binary image to a higher density image wherein each pixel in the input image is replaced with four pixels in the output image. During generation of the pixels in the output image, patterns in the input image are used to determine the direction of interpolation. Once the direction of interpolation is determined, the determined interpolation direction is rotated through 360 degrees to determine the various pixels in the input image to be interpolated in order to generate corresponding pixels in the output image.

U.S. Pat. No. 5,754,710 to Sekine et al. discloses an image resolution conversion method for converting an image of a first resolution into an image of a second resolution by interpolation. During the process, a block defined by a plurality of pre-conversion pixels of the first resolution is assigned to each post-conversion pixel. Edge detection in the block based on data for each pixel of the block is then performed. Resolution conversion using a first interpolation method is performed when the result of the edge detection satisfies predetermined conditions. Resolution conversion is performed using a second interpolation method when the result of the edge detection does not satisfy the predetermined conditions.

U.S. Pat. No. 6,608,699 to Kishimoto discloses a video processing apparatus including edge detecting means for detecting an edge direction in an input image, coefficient selecting means for selecting a coefficient based on the edge direction detected by the edge detecting means and filter means for filtering a frequency band using a frequency characteristic corresponding to the coefficient selected by the coefficient selecting means. Edge detections are used to determine the pixels in the input image that are to be interpolated to form the pixels in the output image.

U.S. Pat. No. 6,624,825 to Fujiyoshi discloses a pixel resolution converting circuit to enlarge an input image. A three-by-three pixel array pattern of the input image including the pixel to be converted is compared with specific array patterns formed by possible combinations of pixel bindery image data. If the input image data matches one of the specific array patterns, image data differing from that of the pixel to be converted is applied to the portion of the image data corresponding to four pixels obtained by vertically and horizontally doubling the pixel to be converted.

U.S. Patent Application Publication No. US 2003/0099410 to Daigi discloses an image processing method wherein pixels of an input image are used to generate pixels in an output image by pattern matching. Three-by-three blocks of pixels centered about the pixels of interest in the input image are compared with patterns to determine the pixels to be interpolated, thereby to generate the pixels in the output image.

Although the above references disclose techniques for expanding an image, improvements are desired. It is therefore an object of the present invention to provide a novel method, apparatus and computer program for expanding a source pixel in a digital image and to a method and apparatus for doubling the size of a digital image.

SUMMARY OF THE INVENTION

Accordingly, in one aspect the present invention there is provided a method of expanding a source pixel in a digital image comprising:

detecting edge direction in the vicinity of said source pixel; and interpolating multiple sets of pixels in a region surrounding said source pixel in the detected edge direction to generate a set of output pixels representing an expansion of said source pixel.

In one embodiment, the set of output pixels includes four output pixels. During the detecting, a block of pixels centered on the source pixel is examined. For each diagonal of the block, the difference in brightness of pixels at opposite ends of the diagonal is determined and the calculated differences are compared to determine the edge direction. The diagonal yielding the smallest difference is deemed to be the detected edge direction.

In one embodiment, the digital image is a greyscale image. In this case, the numeric values of the pixels at opposite ends of the diagonal are used to determine the difference in brightness. In another embodiment, the digital image is a color image. In this case, weighted sums of the red, green and blue channels of the pixels at opposite ends of the diagonal are used to determine the difference in brightness. In yet another embodiment, the digital image is a color image and wherein the detecting and interpolating are performed separately for each color channel of the digital image with the results of the interpolating being combined to yield the set of output pixels.

According to another aspect of the present invention there is provided a method of expanding source pixels in a digital image comprising:

for each source pixel to be expanded:

examining pixels in a region completely surrounding the source pixel to detect edge direction in the region; and interpolating different pairs of diagonally adjacent pixels in said region in the detected edge direction to generate a set of four output pixels representing an expansion of said source pixel.

According to yet another aspect of the present invention there is provided an apparatus for expanding a source pixel in a digital image comprising:

an edge direction detector detecting edge direction in the vicinity of said source pixel; and an interpolator interpolating multiple sets of pixels in a region surrounding the source pixel in the detected edge direction to generate a set of output pixels representing an expansion of the source pixel.

In one embodiment, the edge direction detector examines a block of pixels centered on the source pixel and for each diagonal of the block, determines the difference in brightness of pixels at opposite ends of the diagonal and compares the calculated differences to determine the edge direction. The edge direction detector deems the diagonal yielding the smallest difference as the detected edge direction.

According to still yet another aspect of the present invention there is provided a computer readable medium embodying a computer program for expanding a source pixel in a digital image, said computer program comprising:

computer program code for detecting edge direction in the vicinity of said source pixel; and computer program code for interpolating multiple sets of pixels in a region surrounding said source pixel in the detected edge direction to generate a set of output pixels representing an expansion of said source pixel.

According to still yet another aspect of the present invention there is provided a computer readable medium embodying a computer program for expanding source pixels in a digital image, said computer program comprising:

for each source pixel to be expanded:

computer program code for examining pixels in a region completely surrounding the source pixel to detect edge direction in a region; and computer program code for interpolating different pairs of diagonally adjacent pixels in the region in the detected edge direction to generate a set of four output pixels representing an expansion of the source pixel.

According to still yet another aspect of the present invention there is provided a method of doubling an input digital image comprising:

determining each pixel source in the input digital image that is completely surrounded by other source pixels;

for each of the determined source pixels:

detecting edge direction in the vicinity of the determined source pixel; and interpolating different pairs of diagonally adjacent pixels in a region surrounding the determined source pixel in the detected edge direction to generate a set of four output pixels representing an expansion of the determined source pixel; and generating border pixels surrounding the sets of output pixels.

In one embodiment, during the generating selected output pixels of the sets of output pixels are copied thereby to generate the border pixels.

According to still yet another aspect of the present invention there is provided a method of expanding a source pixel of an input digital image comprising:

interpolating pixels in a region encompassing said source pixel to generate output pixels representing an expansion of said source pixel in a manner such that no output pixel has a center coincident with the center of said source pixel when projected back into said input digital image.

In one embodiment, different pairs of pixels in the region are interpolated in the same direction thereby to generate a set of four output pixels. The direction coincides with the direction of local diagonal edges in the region. The region is a three-by-three block of pixels centered about the source pixel.

The method, apparatus and computer program for expanding source pixels in a digital image provides advantages in that the output image to be interpolated is consistent and free of jagged edges due to the fact that pixels in the output image are generated as a result of an interpolation of source pixels in the input image in a manner so that the centers of the interpolated output pixels are not coincident with the centers of source pixels.

BRIEF DESCRIPTION OF THE DRAWINGS

An embodiment will now be described more fully with reference to the accompanying drawings in which.

DETAILED DESCRIPTION OF THE EMBODIMENT

In the following description, an embodiment of a method, apparatus and computer program for expanding a source pixel in a digital image is provided. During source pixel expansion, local edge direction in the vicinity of the source pixel to be expanded is determined. Multiple sets of pixels in a region surrounding the source pixel are interpolated in the detected local edge direction to generate a set of output pixels representing an expansion of the source pixel. In one embodiment, the size of the input digital image is doubled whereby for each pixel in the input digital image being doubled, that is completely surrounded by other pixels, a set of four output pixels is generated.

The method and apparatus may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion. An embodiment of expansion of source pixels of an input digital image to double its size will now be described more fully with reference to FIGS. 1 to 6.

Figure 1:
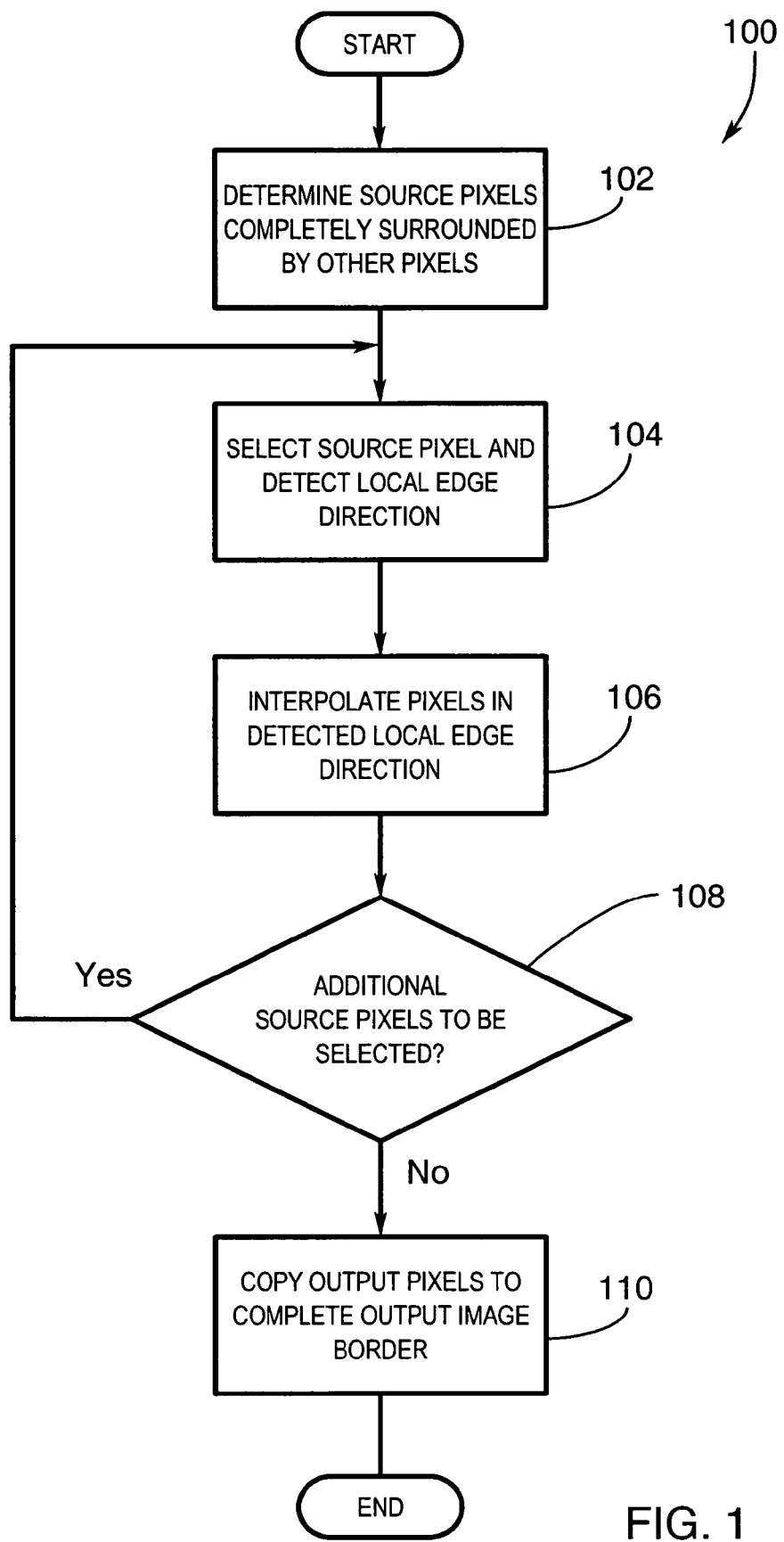
FIG. 1 is a flow chart showing the general steps performed during expansion of source pixels in an input digital image to double the size of the input digital image.

Turning now to FIG. 1, a flowchart showing the general steps performed during expansion of source pixels of an input digital image to double the size of the input digital image is shown and is generally identified by reference numeral 100. Initially, source pixels of the input digital image that are completely surrounded by other source pixels are determined (step 102). An initial source pixel from this group is then selected and local edge direction in the vicinity of the selected source pixel is detected (step 104). Multiple sets of pixels in a region centered about the selected source pixel are then interpolated in the detected local edge direction to generate a set of four output pixels of the doubled output digital image representing an expansion of the selected source pixel (step 106). A check is then made to determine if one or more other source pixels from the group are to be expanded (step 108). If so, the process returns to step 104 and the next source pixel in the group is selected. Steps 104 and 106 are performed until each source pixel in the group has been selected and expanded so that each of the source pixels in the group is represented by four output pixels in the doubled output digital image.

Once each of the completely surrounded source pixels has been expanded in the above-manner, border pixels for the output digital image are generated thereby to complete the output digital image (step 110). During generation of the border pixels, the output pixels at the edges of the output pixel set generated upon completion of steps 104 to 106 are determined. These output pixels are then copied to form the border pixels thereby to complete the digital image doubling process.

Figure 2:
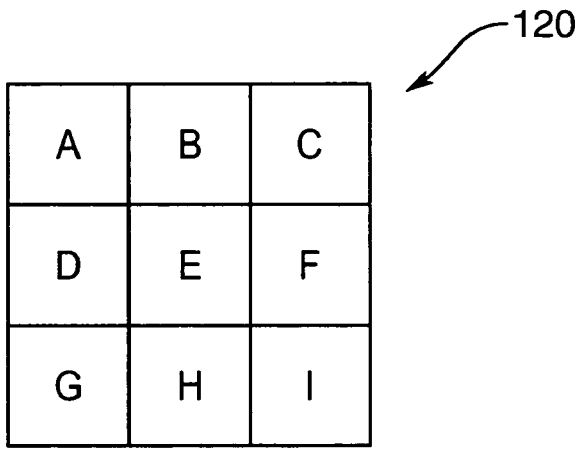
FIG. 2 shows pixels in a region surrounding a source pixel to be expanded.
Figure 3:
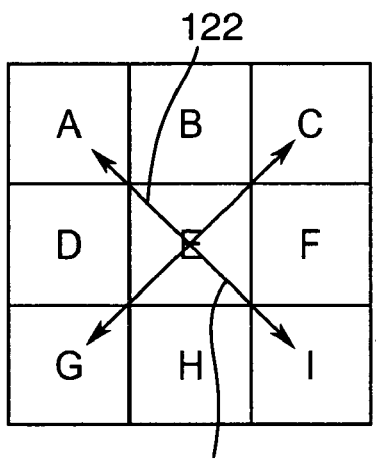
FIG. 3 shows possible local edge directions in the region of FIG. 2.

At step 104, a three-by-three block or region 120 of pixels surrounding and centered about the selected source pixel being expanded is examined for local edge direction as shown in FIG. 2. In this example, the selected source pixel is designated by reference character E. To determine local edge direction in the three-by-three pixel block 120, the absolute difference in the brightness intensity of the pixels at opposite diagonal corners of the pixel block 120 are determined. Thus, in this case, the absolute difference in brightness intensity of pixels A and I and the absolute difference in brightness intensity of pixels C and G are determined. These two absolute difference values are then compared to determine the diagonal yielding the smallest absolute difference value. The diagonal yielding the smallest absolute difference value is determined to be the local edge direction in the pixel block 120.

During brightness intensity determination, if the input digital image is a greyscale image, the numeric values of the pixels at the opposite diagonal corners of the pixel block 120 are used as the brightness intensities of the corner pixels. If the input digital image is a color image, the brightness intensity of each pixel at a corner of the pixel block 120 is calculated using a weighted sum of the red, green and blue channels. In this embodiment, the weightings applied to the various channels are 25% red channel, 60% green channel and 15% blue channel although variations around this weighting will yield satisfactory results. For example, the weightings may be powers of two for efficiency in calculation and take the form 32×red channel, 64×green channel and 16×blue channel.

Figure 4:
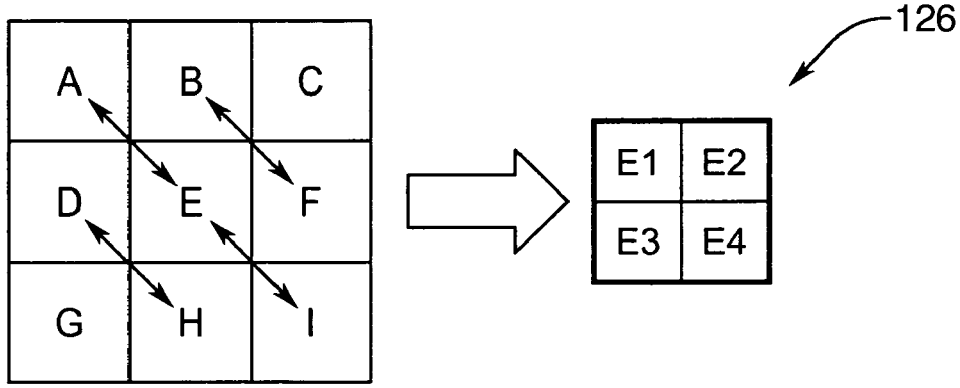
FIG. 4 shows interpolations performed on pixels in the region of FIG. 2 in a detected local edge direction thereby to generate a set of output pixels representing an expansion of the source pixel.
Figures 5, 6:
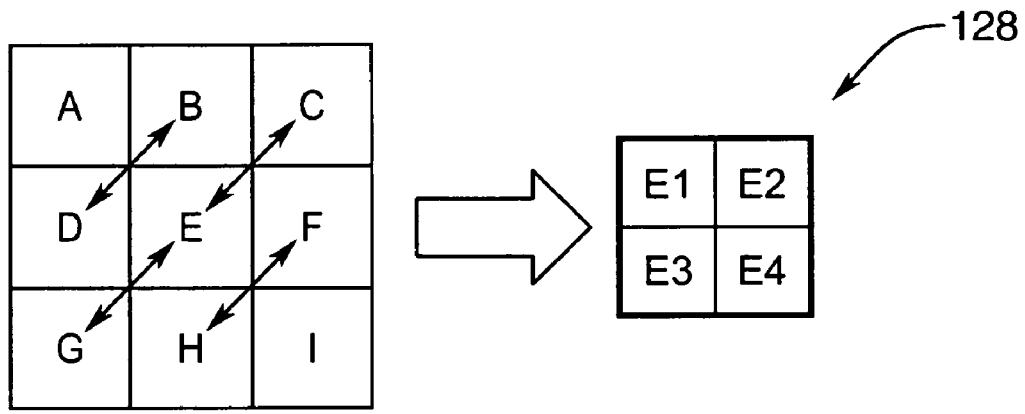
FIG. 5 shows interpolations performed on pixels in the region of FIG. 2 in another detected local edge direction thereby to generate a set of output pixels representing an expansion of the source pixel.
FIG. 6 shows a portion of an output image including sets of interpolated output pixels representing expansions of the source pixels in the region.

With the local edge direction determined, different pairs of diagonally adjacent pixels in the pixel block 120 are interpolated in the determined local edge direction to generate a set of four output pixels $E_1$ to $E_4$ representing an expansion of the selected source pixel E. For example, if the diagonal 122 (see FIG. 3) extending between pixel A and I in the pixel block 120 is determined to be the local edge direction at step 104, pixel pair A and E, pixel pair B and F, pixel pair E and I and pixel pair D and H are interpolated to yield the set 126 of output pixels $E_1$ and $E_4$ as shown in FIG. 4. In this case, interpolating pixels A and E yields output pixel $E_1$, interpolating pixels B and F yields output pixel $E_2$, interpolating pixels D and H yields output pixel $E_3$ and interpolating pixels E and I yields output pixel $E_4$. If the diagonal 124 extending between pixels C and G in the pixel block 120 is determined to be the local edge direction at step 104, pixel pair C and E, pixel pair F and H, pixel pair E and G and pixel pair B and D are interpolated to yield the set 128 of output pixels $E_1$ and $E_4$ as shown in FIG. 5. In this case, interpolating pixels B and D yields output pixel $E_1$, interpolating pixels C and E yields output pixel $E_2$, interpolating pixels E and G yields output pixel $E_3$ and interpolating pixels F and H yields output pixel $E_4$. FIG. 6 shows the result after each pixel in the pixel block 120 has been expanded in the above manner.

During source pixel interpolation, if the input digital image is a greyscale image, the numeric values of the diagonally adjacent pixels in the pixel block are interpolated to generate the greyscale values of the output pixels. If the input digital image is a color image, the red, green and blue values of the diagonally adjacent pixels in the pixel block are interpolated separately to generate the red, green and blue values for the output pixels.

As will be appreciated, a result of the above digital image doubling technique is that if pixels in the doubled output digital image are projected back into the input digital image there are no horizontal or vertical neighbours for the projected pixels in the input digital image. The nearest source pixels lie on diagonals to the centers of the projected pixels. In addition, no pixel in the output digital image has a center that is coincident with the center of a source pixel in the input digital image when projected back into the input digital image. Substantially each pixel in the output image is generated as a result of source pixel interpolation rather than through copying, which results in a consistent looking, expanded output digital image.

If desired, a larger pixel block surrounding the source pixels can be examined to detect local edge direction in the vicinities surrounding the source pixels. Also, horizontal and vertical edges in the pixel block surrounding the source pixels can be considered by examining the pixels above and below, and to the left and right of the source pixel.

In the case of input color digital images, rather than calculating a single brightness intensity for each pixel at a corner of the pixel block during edge direction detection, each color channel of the input digital image can be treated as a separate image with the image expansion results for each color channel being combined to yield the doubled output image. Thus, in this case, edge direction detection is performed for each color channel of the input digital image and with the source pixels for each color channel being interpolated in the determined edge direction. As will be appreciated, the detected edge directions for the color channels may be different.

Although an embodiment has been described, those of skill in the art will appreciate that variations and modifications may be made without departing from the spirit and scope thereof as defined by the appended claims.

What is claimed is:

1. A method of expanding a source pixel in a digital image comprising:
    examining pixels along different diagonals in the vicinity of said source pixel to determine a local diagonal edge direction corresponding to one of said diagonals; and
    interpolating multiple sets of pixels in a region surrounding said source pixel in the detected edge direction to generate a set of output pixels representing an expansion of said source pixel.

2. The method of claim 1 wherein said set of output pixels includes four output pixels.

3. The method of claim 1 wherein said examining comprises:
    examining a block of pixels centered on said source pixel; and
    for each diagonal of said block:
    determining the difference in brightness of pixels at opposite ends of the diagonal; and
    comparing the calculated differences to determine the edge direction.

4. The method of claim 1 wherein the digital image is a color image and wherein said detecting and interpolating are performed separately for each color channel of said image with the results of said interpolating being combined to yield the set of output pixels.

5. A method of expanding source pixels in a digital image comprising:
    for each source pixel to be expanded:
    examining pixels along different diagonals in a region completely surrounding the source pixel to detect a local diagonal edge direction in the region corresponding of said diagonals; and
    interpolating different pairs of diagonally adjacent pixels in said region in the detected edge direction to generate a set of four output pixels representing an expansion of said source pixel.

6. The method of claim 5 wherein said examining comprises comparing the brightness of pixels in said region.

7. The method of claim 6 wherein said examining further comprises:
    for each diagonal of said region, determining the difference in brightness of pixels at opposite ends of the diagonal; and
    wherein during said comparing, the calculated differences are compared to detect the diagonal yielding the smallest difference and hence the edge direction.

8. The method of claim 5 wherein the digital image is a color image and wherein said detecting and interpolating are performed separately for each color channel of said image with the results of said interpolating being combined to yield the set of output pixels.

9. A medium readable by a machine embodying a program of instructions executable by the machine to perform the method of claim 5.

10. An apparatus for expanding a source pixel in a digital image comprising:
    an edge direction detector examining pixels in the vicinity of said source pixel along different diagonals to determine a local diagonal edge direction corresponding to one of said diagonals; and
    an interpolator interpolating multiple sets of pixels in a region surrounding the source pixel in the detected edge direction to generate a set of output pixels representing an expansion of the source pixel.

11. An apparatus according to claim 10 wherein said set of output pixels includes four output pixels.

12. An apparatus according to claim 11 wherein said edge direction detector examines a block of pixels centered on said source pixel and for each diagonal of the block, determines the difference in brightness of pixels at opposite ends of the diagonal and compares the calculated differences to determine the edge direction.

13. A method of doubling an input digital image comprising:
    determining each source pixel in the input digital image that is completely surrounded by other source pixels;
    for each of the determined source pixels:
    detecting edge direction in the vicinity of the determined source pixel; and
    interpolating different pairs of diagonally adjacent pixels in a region surrounding the determined source pixel in the detected edge direction to generate a set of four output pixels representing an expansion of the determined source pixel; and
    generating border pixels surrounding the sets of output pixels.

14. A method of expanding a source pixel of an input digital image comprising:
    interpolating pixels in a region encompassing said source pixel to generate output pixels representing an expansion of said source pixel in a manner such that no output pixel has a center coincident with the center of said source pixel when projected back into said input digital image.

15. The method of claim 14 wherein different pairs of pixels in said region are interpolated in the same direction thereby to generate a set of four output pixels.

16. A method of expanding a source pixel in a digital image comprising:
    detecting edge direction in the vicinity of said source pixel; and
    interpolating multiple sets of pixels in a region surrounding said source pixel in the detected edge direction to generate a set of output pixels representing an expansion of said source pixel, wherein said detecting comprises:
    examining a block of pixels centered on said source pixel; and
    for each diagonal of said block:
    determining the difference in brightness of pixels at opposite ends of the diagonal; and
    comparing the calculated differences to determine the edge direction.

17. The method of claim 16 wherein the diagonal yielding the smallest difference is deemed to be the detected edge direction.

18. The method of claim 17 wherein the absolute difference in brightness of pixels at opposite ends of each diagonal is determined.

19. The method of claim 17 wherein the digital image is a greyscale image and wherein the numeric values of the pixels at opposite ends of the diagonal are used to determine the difference in brightness.

20. The method of claim 17 wherein the digital image is a color image and wherein weighted sums of the red, green and blue channels of the pixels at opposite ends of the diagonal are used to determine the difference in brightness.

21. The method of claim 19 wherein said block is a three-by-three block of pixels.

22. The method of claim 20 wherein said block is a three-by-three block of pixels.

23. The method of claim 16 wherein said region and block include the same pixels.

24. The method of claim 16 wherein the digital image is a color image and wherein said detecting and interpolating are performed separately for each color channel of said image with the results of said interpolating being combined to yield the set of output pixels.

25. A medium readable by a machine embodying a program of instructions executable by the machine to perform the method of claim 16.

26. A method of expanding source pixels in a digital image comprising:
   for each source pixel to be expanded:
      examining pixels in a region completely surrounding the source pixel to detect edge direction in the region; and
      interpolating different pairs of diagonally adjacent pixels in said region in the detected edge direction to generate a set of four output pixels representing an expansion of said source pixel, wherein said examining further comprises:
      for each diagonal of said region, determining the difference in brightness of pixels at opposite ends of the diagonal; and
      wherein during said comparing, the calculated differences are compared to detect the diagonal yielding the smallest difference and hence the edge direction.

27. An apparatus for expanding a source pixel in a digital image comprising:
   an edge direction detector detecting edge direction in the vicinity of said source pixel; and
   an interpolator interpolating multiple sets of pixels in a region surrounding the source pixel in the detected edge direction to generate a set of output pixels representing an expansion of the source pixel, wherein said edge direction detector examines a block of pixels centered on said source pixel and for each diagonal of the block, determines the difference in brightness of pixels at opposite ends of the diagonal and compares the calculated differences to determine the edge direction.

* * * * *

UNITED STATES PATENT AND TRADEMARK OFFICE
CERTIFICATE OF CORRECTION

PATENT NO. : 7,242,412 B2  Page 1 of 1
APPLICATION NO. : 11/054102
DATED : July 10, 2007
INVENTOR(S) : Graham Sellers It is certified that error appears in the above-identified patent and that said Letters Patent is hereby corrected as shown below:

<u>Column 7</u>

Line 40, please change "corresponding of said diagonals; and" to

--corresponding to one of said diagonals; and--

Signed and Sealed this

Eighth Day of April, 2008

JON W. DUDAS
*Director of the United States Patent and Trademark Office*